US012307933B1

(12) United States Patent
Lee et al.

(10) Patent No.: US 12,307,933 B1
(45) Date of Patent: May 20, 2025

(54) ORGANIC LIGHT EMITTING DIODE DISPLAY FILM PIXEL SHIFTING WITH TEMPORAL SEGMENTED IMAGE TRACKING

(71) Applicant: Dell Products L.P., Round Rock, TX (US)

(72) Inventors: Jason I. Lee, Austin, TX (US); Deeder M. Aurongzeb, Austin, TX (US); Asim M. Siddiqui, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/647,142

(22) Filed: Apr. 26, 2024

(51) Int. Cl.
*G09G 3/30* (2006.01)
*G09G 3/00* (2006.01)
*G09G 3/3225* (2016.01)

(52) U.S. Cl.
CPC .......... *G09G 3/007* (2013.01); *G09G 3/3225* (2013.01); *G09G 2320/045* (2013.01); *G09G 2320/046* (2013.01); *G09G 2320/048* (2013.01); *G09G 2320/0693* (2013.01); *G09G 2330/02* (2013.01); *G09G 2340/0471* (2013.01); *G09G 2340/0478* (2013.01); *G09G 2354/00* (2013.01)

(58) Field of Classification Search
CPC ........................................ G09G 3/30–3291
See application file for complete search history.

(56) References Cited

U.S. PATENT DOCUMENTS

| | | | |
|---|---|---|---|
| 7,205,717 B2 | 4/2007 | Cok | |
| 7,279,708 B2 | 10/2007 | Kwak et al. | |
| 7,911,473 B2 * | 3/2011 | Noorbakhsh | G09G 5/363 345/530 |
| 8,169,132 B2 | 5/2012 | Oh et al. | |
| 8,411,000 B2 | 4/2013 | You et al. | |
| 9,583,037 B2 | 2/2017 | Omoto | |
| 10,032,414 B2 | 7/2018 | Kim et al. | |
| 10,037,724 B2 | 7/2018 | Musgrave et al. | |
| 10,049,614 B2 | 8/2018 | Peana et al. | |
| 10,460,662 B2 | 10/2019 | Song et al. | |
| 10,796,622 B2 | 10/2020 | Chaji et al. | |
| 10,885,852 B2 | 1/2021 | Zhang et al. | |
| 2008/0254217 A1 | 10/2008 | Boroson | |
| 2009/0135114 A1 * | 5/2009 | White | G09G 3/3225 345/78 |
| 2017/0309215 A1 * | 10/2017 | Perdices-Gonzalez | G09G 3/348 |
| 2018/0357955 A1 * | 12/2018 | Wang | G09G 3/3225 |
| 2019/0386256 A1 | 12/2019 | Quinn et al. | |
| 2020/0152726 A1 | 5/2020 | Hong et al. | |

(Continued)

*Primary Examiner* — Roy P Rabindranath
(74) *Attorney, Agent, or Firm* — Zagorin Cave LLP; Robert W. Holland

(57) ABSTRACT

A display having organic light emitting diode (OLED) material manages useful life based on usage environment by forecasting OLED driving-power events in generic and performance modes so that an end user can select how to view images over the display lifetime. Presentation of visual images to reduce OLED material degradation can include variations based on end user distance to the display and adjustments to visual image brightness with on-pixel ratio settings when HDR and SDR movies are presented. In one example embodiment, boundary visual image presentations are shifted to plural positions at the display based upon OLED material usage information.

19 Claims, 13 Drawing Sheets

(56) References Cited

U.S. PATENT DOCUMENTS

| | | | | |
|---|---|---|---|---|
| 2021/0125554 | A1 | 4/2021 | Lee et al. | |
| 2021/0264830 | A1* | 8/2021 | Lee | G09G 3/007 |
| 2021/0366359 | A1* | 11/2021 | Hong | G09G 3/32 |
| 2022/0375400 | A1* | 11/2022 | Kim | G09G 5/391 |

* cited by examiner

| OPR PRESET | HDR1000 (MIN 1000 NITS) | | | |
|---|---|---|---|---|
| | | LUM | OPR | TOTAL POWER MAX (120Hz, W/CG, W/TOUCH) |
| | SDR | 600 | 100% | 11.65 |
| 40% | HDR | 1195 | 10% | 4.24 |
| | HDR | 1195 | 30% | 8.02 |
| | HDR | 1195 | 40.00% | 9.92 |
| | HDR | 1081 | 50% | 10.06 |
| | HDR | 872 | 70% | 12.00 |
| | HDR | 687 | 90% | **12.12** |
| | HDR | 800 | 100% | 11.56 |
| 30% | HDR | 1195 | 10% | 4.24 |
| | HDR | 1195 | 30.00% | 8.02 |
| | HDR | 1004 | 50% | 9.5 |
| | HDR | 831 | 70% | 11.56 |
| | HDR | 675 | 90% | **11.87** |
| | HDR | 600 | 100% | 11.XX |
| 20% | HDR | 1195 | 10% | 4.24 |
| | HDR | 1195 | 20.00% | 6.13 |
| | HDR | 1109 | 30% | 7.1 |
| | HDR | 948 | 50% | 9.1 |
| | HDR | 800 | 70% | 11.22 |
| | HDR | 665 | 90% | 11.64 |
| | HDR | 600 | 100% | **11.88** |

TOTAL MAXIMUM POWER FOR DIFFERENT OPR PRESET VALUE

HDR PEAK LUMINANCE DROPS

| UTILITY | NITS/ BRIGHTNESS | TIME-HOUR | PIXEL SHIFT - GENERIC USER |
|---|---|---|---|
| WEB A | MAXIMUM | 1 | 5% |
| DESKTOP FILES | 80% | 2 | 5% |
| EXCEL/WORK/PPT | 80% | 5 | 5% |
| MOVIE A | MAXIMUM | 2 | 5% |
| MOVIE B | MAXIMUM | 1.5 | 2% |

| UTILITY | NITS/ BRIGHTNESS | TIME-HOUR | PIXEL SHIFT - GENERIC USER |
|---|---|---|---|
| WEB A | MAXIMUM | 1 | 5% |
| DESKTOP FILES | 80% | 2 | 10% |
| EXCEL/WORK/PPT | 80% | 5 | 5% |
| MOVIE A | MAXIMUM | 2 | 5% |
| MOVIE B | MAXIMUM | 1.5 | 2% |

ORGANIC LIGHT EMITTING DIODE DISPLAY FILM PIXEL SHIFTING WITH TEMPORAL SEGMENTED IMAGE TRACKING

BACKGROUND OF THE INVENTION

Field of the Invention

The present invention relates in general to the field of information handling system displays, and more particularly to an information handling system organic light emitting diode display film pixel shifting with temporal segmented image tracking.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems integrate processing components in a housing that cooperate to process information. Desktop information handling systems typically interface with physical resources at a location, such as a power outlet, peripheral keyboard and peripheral display. Portable information handling systems typically couple processing components in a portable housing that can interface with the physical resources and also integrate a keyboard, a display and a power source in the portable housing to support mobile operations. Portable information handling systems allow end users to carry a system between meetings, during travel, and between home and office locations so that an end user has access to processing capabilities while mobile. One increasingly popular option for use as an integrated display is an organic light emitting diode (OLED) display film that generates visual images from an array of pixels of organic material that provide red, green and blue light in response to application of an electrical charge. OLED display films provide a high quality visual image with a low profile since the pixels provide illumination without a backlight. The OLED film also offers the advantage of a flexible display material that folds to offer a conformal fit and to fold across hinged housing portions, such as a main housing and lid housing of a portable information handling system.

One difficulty associated with OLED display films is that the organic material that generates illumination tends to degrade over time, resulting in decreased brightness for a given power input. The amount of degradation varies for each color of OLED material and for each pixel based upon the amount of usage for each color of material at each pixel. To compensate for OLED material degradation, the display typically tracks OLED material usage and adjusts the power applied at the pixels for a desired color illumination of a desired brightness. For instance, when blue OLED material has had a certain amount of use, the reduction in blue light generate for a given current application is estimated so that a greater current is applied to generate a desired amount of blue light. Accurate compensation improves image quality and supports a consistent display brightness over time. Eventually, even with accurate pixel illumination compensation for OLED material degradation, the OLED material will degrade to a point at which quality visual images are difficult to produce without excessive current application. Typical commercial and personal display warranties last for five to seven years, which can be difficult to achieve when OLED L50 specifications for a 50% drop in performance from a starting performance are approximately 2 to 3 years depending on the usage case.

Other difficulties associated with OLED display films include power consumption, thermal hotspots and visual image stickiness. OLED material generates illumination by a current applied to the material with brightness managed by the amount of current. Bright visual images increase power consumption and impact portable system battery life. The amount of power consumption increases as OLED material degrades with a greater current applied to degraded material to generate a given amount of illumination. The dissipation of power tends to generate heat as a byproduct that increases thermals at the display film, resulting in more rapid degradation and, in some instances, heat at a point of touch by an end user. Thermal hotspots can vary across the display film based upon the presentation of visual images of different colors and brightness as well as the degradation of the OLED material. Visual image stickiness is the result of repeated presentation of a same visual image at a same location for extended time periods, such as icons at a home screen. After time these images tend to get burned into the visual presentation and appear as ghost images from the degradation of OLED material at the location. Excessive degradation of one color over others due to the repeated presentation can also produce thermal hotspots as the display film works to overcome the degradation to present a visual image with consistent color and brightness.

SUMMARY OF THE INVENTION

Therefore, a need has arisen for a system and method which manages display film OLED degradation while maintaining a quality visual image presentation for a complete warranty period.

In accordance with the present invention, a system and method are provided which substantially reduce the disadvantages and problems associated with previous methods and systems for manage OLED material display film usable life and visual image presentation quality. OLED material power driving events are tracked to forecast OLED material degradation and provide the end user with an election of a selected of generic and performance visual image presentation and an extended warranty life period. OLED material degradation is managed to achieve improved end user productivity by modeling viewing comfort and adjusting display characteristics to provide viewing comfort associated with increased productivity. Visual images presented at the display area adapted based upon a number of factors to balance productivity, visual image quality and OLED material life.

More specifically, an information handling system processes information with a processor that executes instructions in cooperation with a memory. The information is presented at a display as visual images by applying a charge to OLED material of red, green and blue illumination at an array of pixels. The display tracks OLED material use and power-driving related events, such as thermal conditions and overclocking of the display, to forecast OLED material display degradation against an expected life as represented by a warranty period. When forecasted degradation exceeds an amount associated with generic use, an end user selects whether to manage display visual image presentation to meet a warranty period with a generic operational mode or to enhance visual image presentation with a performance operational mode that has a reduced expected display life and warranty. The high performance operational mode may include fuzzy logic that modifies high performance presentation where the content or other factors do not call for increase OLED degradation, such as with office document content or when an end user distance to the content makes end user viewing focused away from the edge of the display. In various embodiments, the presentation of visual images is modified to optimize end user value for OLED degradation, such as by shifting boundaries of persistent visual presentations like operating system icons and windows that define content along an edge. In one embodiment, visual image presentation is adjusted to provide an end user comfort associated with increased productivity, such as by adjusting brightness, glare, sharpness, color and image stability based upon a model generated with machine learning.

The present invention provides a number of important technical advantages. One example of an important technical advantage is that an information handling system OLED material display manages usable life of the OLED material with a forecast of OLED material degradation based upon power driving related events, such as thermal conditions at the display and overclocking of display scan rate. When forecasted OLED material degradation exceeds a rate compatible with warrantied display operations, an end user can elect whether to accept a shorter warranty while presenting visual images in performance mode or have a full expected life of the display while viewing images in a generic operational mode. The OLED material useful life can be further extended with managed presentation of images based on distance by an end user to the display, comfort of the end user viewing the display and other display factors.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A display film having organic light emitting diode (OLED) material manages display characteristics to achieve a desired life and performance. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
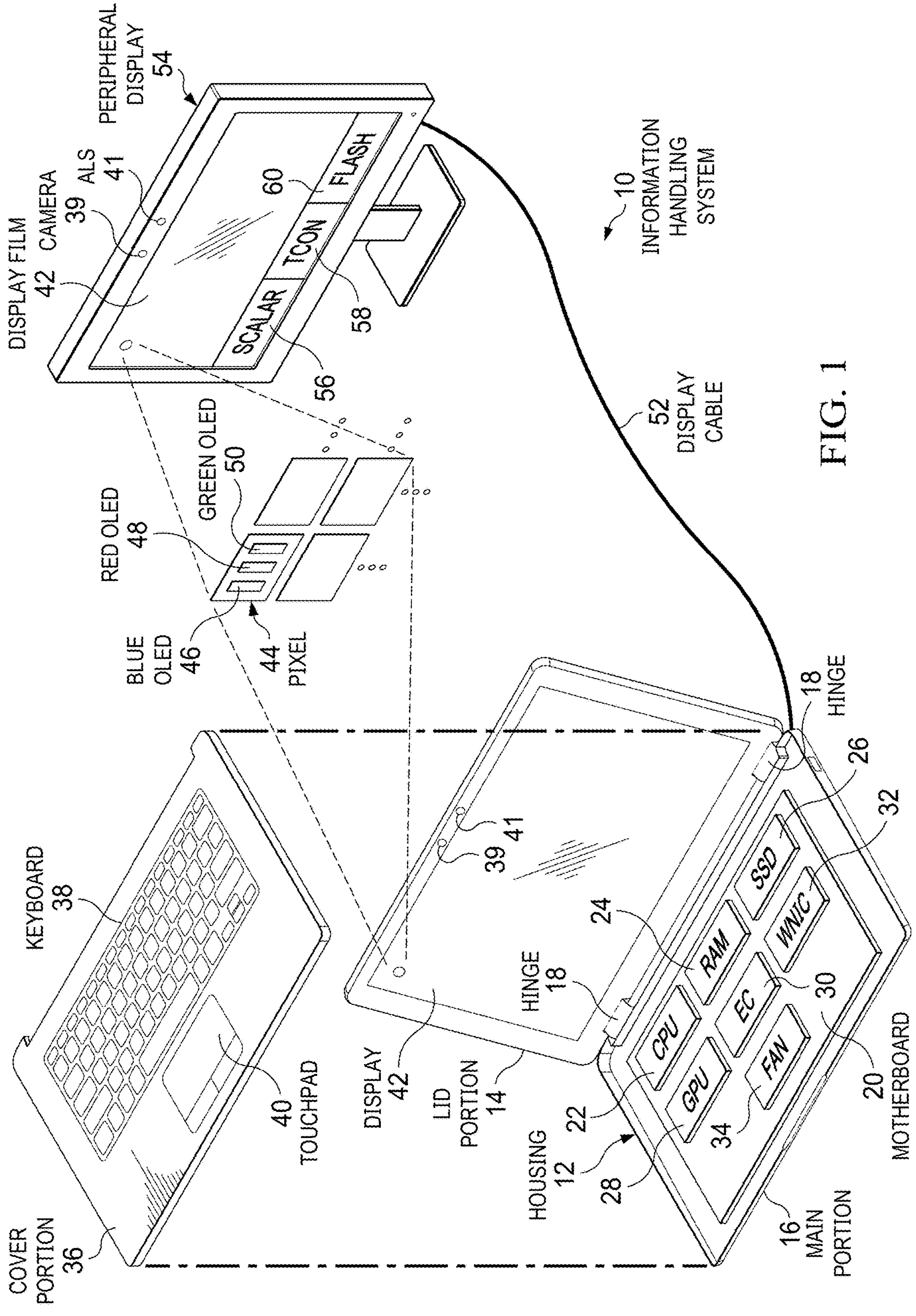
FIG. 1 depicts an exploded perspective view of an information handling system having an integrated and peripheral display with life and performance management.

Referring now to FIG. 1, an exploded perspective view depicts an information handling system 10 having an integrated and peripheral display with life and performance management. In the example embodiment, information handling system 10 has a mobile configuration built in a portable housing 12 having a lid portion 14 rotationally coupled to a main portion 16 by a hinge 18. The housing main portion 16 couples with a motherboard 20 that interfaces processing components that cooperate to process information. A central processing unit (CPU) 22 executes instructions to process information in cooperation with a random access memory (RAM) 24 that stores the instructions and information. A solid state drive (SSD) 26 includes non-transient memory, such as flash integrated circuits, that store the instructions and information during power down, such as an operating system and applications that are retrieved at power up to manage system operations and perform tasks. For example, an embedded controller 30 manages power to bring the system to an operational state and coordinates communication between processing components on a physical level. A graphics processing unit (GPU) 28 interfaces with CPU 22 to further process information to define visual images for presentation at integrated display film 42 and peripheral display 54 as described in greater detail below. A wireless network interface controller (WNIC) 32 supports communication with external devices and networks through wireless signals, such as WIFI and BLUETOOTH. A cooling fan 34 couples in main portion 16 to generate a cooling airflow that manages thermal conditions, such as under the control of embedded controller 30. A housing cover portion 36 couples over the processing components and supports a keyboard 38 and touchpad 40 that accept end user inputs. In the example embodiment, a camera 39 is aligned to capture a visual image of the viewing area in front the display, such as with an infrared camera that supports determination of a distance to the end user and tracks a gaze direction of the end user eyes. An ambient light sensor 41 captures ambient light intensity and color temperature to adjust the image presented at the display for ambient light conditions.

In operation, information handling system 10 processes information for presentation at a display film 42 having a array of pixels 44. In the example embodiment, a display film 42 integrates in housing lid portion 14 to present visual images when the system is mobile, and another display film 42 is built into peripheral display 54 to present visual images communicated through a display cable 52. Peripheral display 54 manages the presentation of visual images with a scalar 56, timing controller 58 and instructions stored in a non-transitory flash memory 60. For example, scalar 56 and timing controller 58 include a processing resource, such as a microcontroller unit (MCU) that executes instructions to coordinate scanning of pixel values from GPU 28 at pixels 44 so that the pixels present a visual image as a composite of the pixel values across the array of pixels. In the example embodiment, display films 42 has pixels 44 of organic light emitting diode (OLED) material that generates light when an electric charge is applied. A blue OLED material 46, red OLED material 48 and green OLED material 50 combine to create light with a color defined by the pixel value, such as by adjusting the amount of charge applied to each OLED color. Pixel brightness is adjusted by proportionally adjusting total current at a give color so that each OLED material color creates a variable intensity of light. Over time and use the OLED material degrades so that an increase charge is needed to generate the same amount of light. OLED material degradation is tracked in a processing component of the display, such as the timing controller so that the amount of charge applied for a given image adjusts for the degradation to generate visual images with a consistent color quality.

One difficulty with the use of OLED material pixels is that the amount of OLED material degradation that takes place over time. OLED material degradation tends to occur in an uneven manner so that OLED usage tracking by the timing controller is generally used to adjust charge to the pixels so that image quality remains uniform across a display film. Since display films have different amounts of usage at different systems depending upon the demands of different end users, the expected life of a display film for a given platform can vary significantly, which can make warranty of the display film difficult where high usage demands have a greater degradation of OLED material than an expected use. Unnecessary replacement of display films and components before end of life is reached can result where a system is designed to meet a worse case usage scenario. In order to manage the OLED material degradation of a display film, the example embodiment collects OLED material driving-power related events, such as thermal heat and overclocking, and applies the driving-power related events to forecast future driving-power related events based upon usage cases. The forecasted OLED material degradation for different usage cases create a time series defined for a generic usage case and high performance usage cases. For example, a generic usage case might involve a normal workday of six hours of screen time while a high performance usage case might involve a “fuzzy state” that equates to 50 hours of screentime in a work week, or about 8 to 14 hours of screentime a day. Based upon the forecast OLED material life spans are extended with a re-calibration when the system reaches a degradation associated with a predetermined loss of brightness, such as when maximum brightness is 400 nits or less, by dropping brightness based on usage and context as guided by the forecast and OLED material usability information. For instance, based upon the recalibration and forecasted end of life of degraded OLED material, an end user is given a choice of a performance level with each available performance level associated with a warranty life. In a generic performance level, OLED material degradation is reduced, such as by reducing the refresh rate and increasing fan speed. In a high performance level, warranty life is reduced while a “fuzzy” usage state optimizes OLED material life through enhanced image presentation for selected applications while background and noncritical workloads are managed to have less impact on OLED material degradation. The fuzzy usage state manages presentation of visual images to optimize display film life with reduced degradation and image stickiness as described below. Although the example embodiment is an OLED display, other types of display devices may be relevant to disclosure and used in the place of OLED display devices, such as QOLED, QuLED, uLED and similar displays. The example embodiments use machine learning of various forms, however, future GPU processing performance increases may support the use of AI optimization directly.

Figure 2:
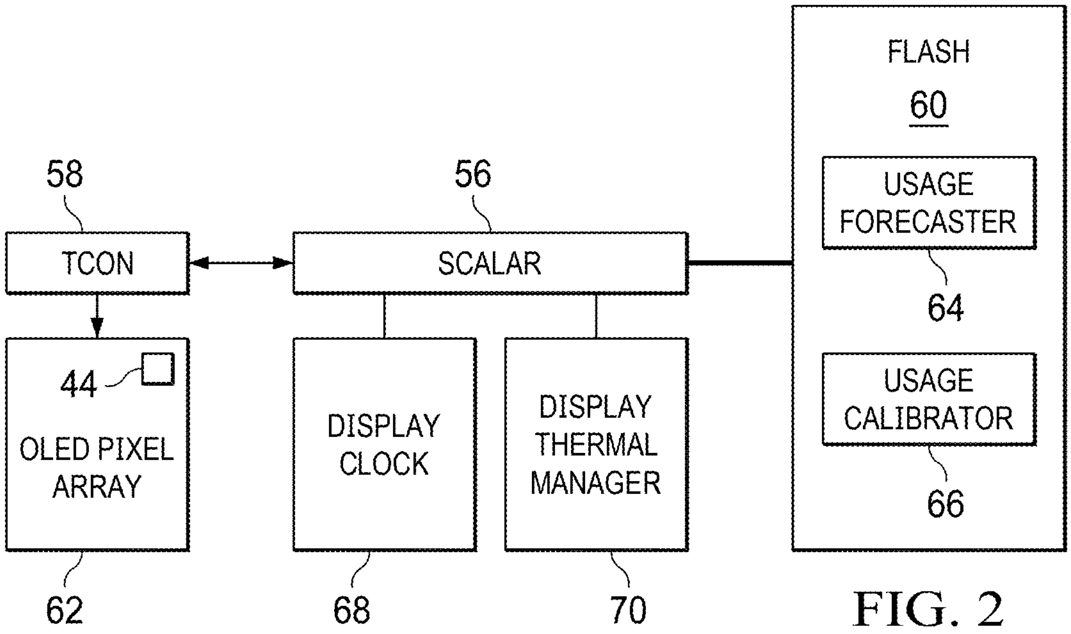
FIG. 2 depicts a block diagram of a system for managing OLED material degradation and useful life through forecasting of usage and performance levels.

Referring now to FIG. 2, a block diagram depicts a system for managing OLED material degradation and useful life through forecasting of usage and performance levels. Timing controller 58 and scalar 56 included logical processing resources, such as a microcontroller unit (MCU) that executes instructions stored in flash memory 60 to select a generic or high performance mode of visual presentation at an OLED pixel array 62 having plural pixels 44 made of OLED material. A display clock 68 times scan rates for presentation of pixel values at OLED pixel array 62. A display thermal manager 70 manages thermal conditions at the display, such as a cooling fan speed to reject excess thermal energy from the display. Flash non-transient memory 60 stores a usage forecaster 64 and a usage calibrator 66 that execute on a processing resource of the timing controller 58 and/or scalar 56 to manage the OLED material degradation and the display selection of generic or performance operating modes. Usage calibrator 66 tracks OLED material use over time, such as the amount of illumination provided by each pixel and associated degradation. In particular, power-related events are tracked that indicate whether an end user is operating at a generic or performance level, such as based upon thermal states at the display and overclocking events associated with rapid visual image processing. Usage forecaster 64 applies the historical display use and OLED degradation to forecast a remaining life of the display and recalibrate the display to meet end user warranty expectations. When a remaining life determined by usage forecaster 64 indicates that OLED material degradation exceeds warrantied use, the end user is provided with a notice and an opportunity to select a generic operating mode that will forecast to meet the warranty expectations or a performance mode that has a reduced warranty period equal to the forecasted life.

In one example embodiment, the operational life of the OLED display film is divided into two portions. During a first portion, OLED material degradation does not impact the brightness available from the display, such as a minimum brightness of 400 nits. During this first stage of operational life, end user interactions are tracked to align the end user's preferences with the display mode and operational life. In a second stage that starts once display brightness is decreased below the maximum brightness, a periodic recalibration is performed to adjust the display images provided in terms of brightness based upon the power-related events. For example, a display that is limited to 400 nits degrades with typical use in two to three years to a point at which the maximum brightness of 400 nits is no longer available. In the second operational phase, recalibration of the display at a lower brightness is performed periodically, such as every three to five percent of degradation of the OLED material. The recalibration is based upon the end user's selection of a generic mode or performance mode of operation with a warranty associated with each operational mode. In addition, variations to operational conditions at the display conserve OLED material life by adjusting how the images are presented, as described in greater detail below.

Figure 3:
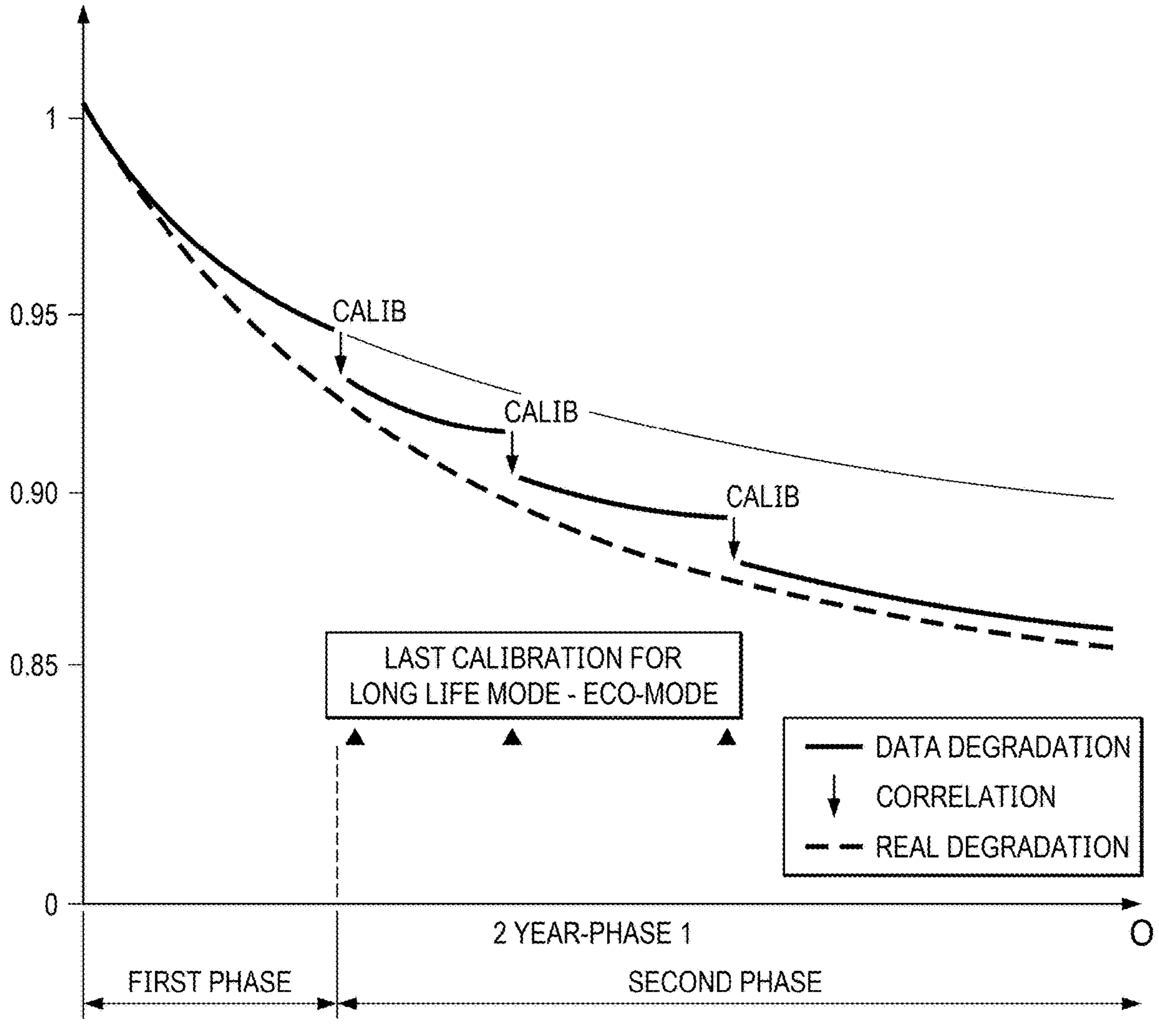
FIG. 3 depicts a chart having a relative life of a display film scaled for an example of a five year life using three stages of recalibration of performance and color.

Referring now to FIG. 3, a chart depicts a relative life of a display film scaled for an example of a five year life using three stages of recalibration of performance and color. In the example embodiment, the chart depicts an expected OLED material degradation for a generic use case under a typical warranty of five to seven years of usage for six hour work days. In the first phase of two years of usage, the display film has a capability of presenting visual images with a brightness of greater than a maximum available setting, such as 400 nits. As shown by the dashed lines, actual OLED material degradation is greater than the initial data degradation forecasted for generic use. At the end of the first phase, such as two years or when the maximum brightness is no longer available, a recalibration is performed based upon actual usage data that includes power-related events, such as thermal heat sensed at the display film and overclocking of display visual image presentations. In the example embodiment, recalibration is performed at three to five percent granularity of OLED material degradation. At the first three recalibrations, the end user requested a performance mode for presentation of visual images that supported continued increased power events with a lower warranty period but increased display responsiveness. At the last calibration in the second phase of use, the end user selected a generic operational mode that reduces display degradation by having reduced display responsiveness. For example, in the generic operational mode relative to the performance operational mode a reduced scan rate and lower electric charge are assigned present visual images so that actual degradation parallels expected data-based degradation. Although the example embodiment depicts two modes of operation for generic and performance presentation of visual images, alternative embodiments may have other types of operational modes. For instance, calibration may be performed to target a desired warranty period in a manner that provides an intermediary presentation of visual images between the greatest performance and the generic warranty operations. In another embodiment, specific applications may be assigned generic versus performance modes of operation, such as a generic operation mode for word processing and other office applications and a performance operation mode for gaming and video viewing applications. The selection of power-related event limits to achieve desired presentation quality versus OLED material degradation is based upon forecasts of OLED degradation from historical power-related events while tracking current usage patterns and demands.

Figure 4:
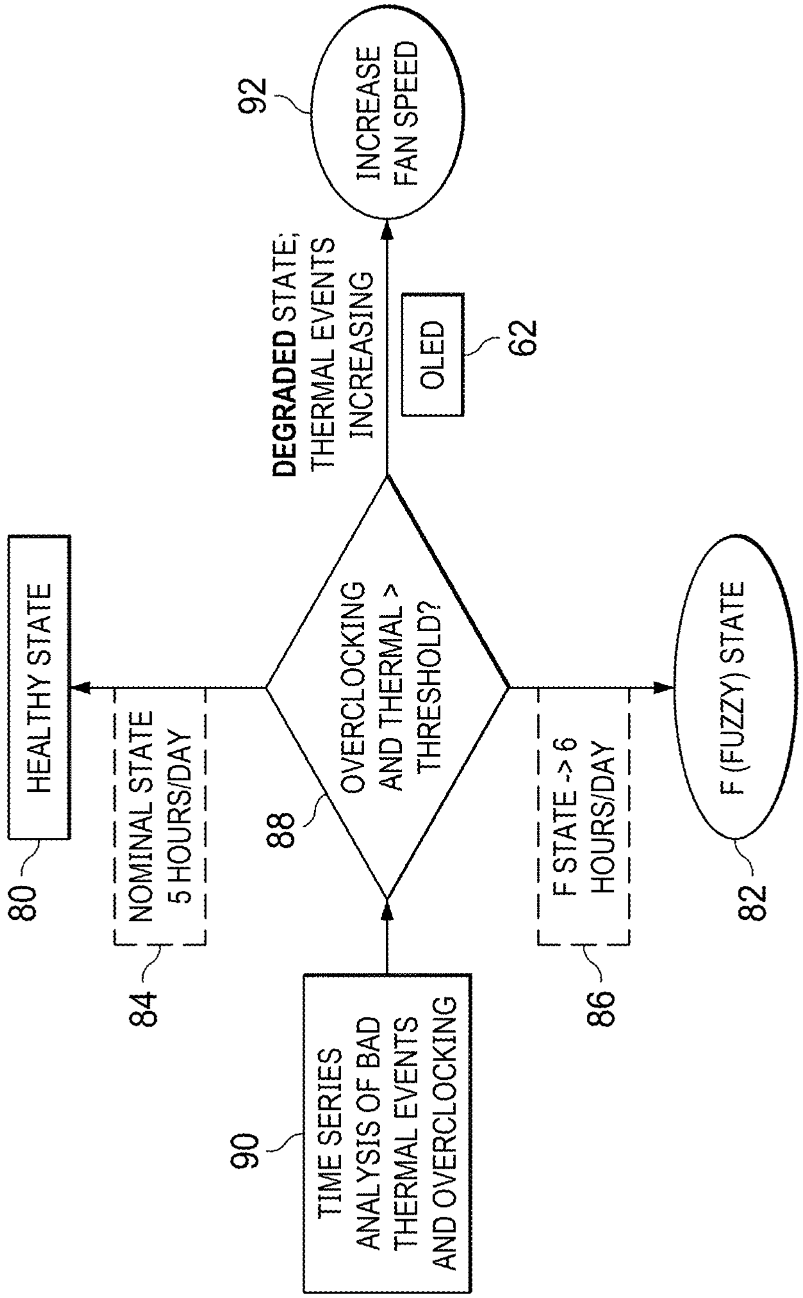
FIG. 4 depicts a flow diagram of a process for managing display film OLED material degradation by adjusting between a generic operational mode and a performance operational mode.

Referring now to FIG. 4, a flow diagram depicts a process for managing display film OLED material degradation by adjusting between a generic operational mode and a performance operational mode. In the example embodiment, OLED display film operational modes are set between a healthy state mode 80 that uses a generic operational mode for expected OLED material degradation and a fuzzy state mode 82 that uses a performance operational mode with accelerated OLED material degradation. The healthy or fuzzy state is selected based on the end user preference for the quality of presentation of visual images versus warranty life that is worn down with additional OLED material 62 degradation by greater amounts of power-related events. In the example embodiment, a fuzzy state is associated with a forecast of greater than six hours of presentation of visual images in a day at 86 while a healthy state is associated with five or fewer hours of presentation of visual images in a day at 84. A state machine or other decision module determines at step 88 whether an overclocking and thermal threshold is exceeded at step 88 by reference to a forecast performed by a time series analysis 90 of historical thermal and overclocking events. For example, when an end user configures the display to accept a lower warranty period for an improved improvement, a power-related event threshold that is exceeded at step 88 will result in use of fuzzy state 82 for greater scan rates and image brightness for selected applications. When an end user configures the display to have a full warranty period, a healthy state is applied to obtain the optimal presentation of visual images without excessive OLED material wear. As power related events are used to obtain performance visual image presentation, the process selectively applies increased fans speed at step 92 to remove excess thermal energy. The power-related event settings may vary for different applications, such as office versus gaming applications, and based upon forecasted OLED degradation as the display usage is tracked. For instance, a scan rate of 60 Hz may be used for office applications to reduce OLED material degradation while a scan rate of 120 Hz is used for gaming applications. In the example embodiment, a timing controller manages the display degradation monitoring and a GPU manages the fuzzy state selection of visual image presentation based on content. In various embodiments, the logic for the management of display operations may reside a various processing resources, such as the CPU, GPU, embedded controller, timing controller and scalar.

Figure 5:
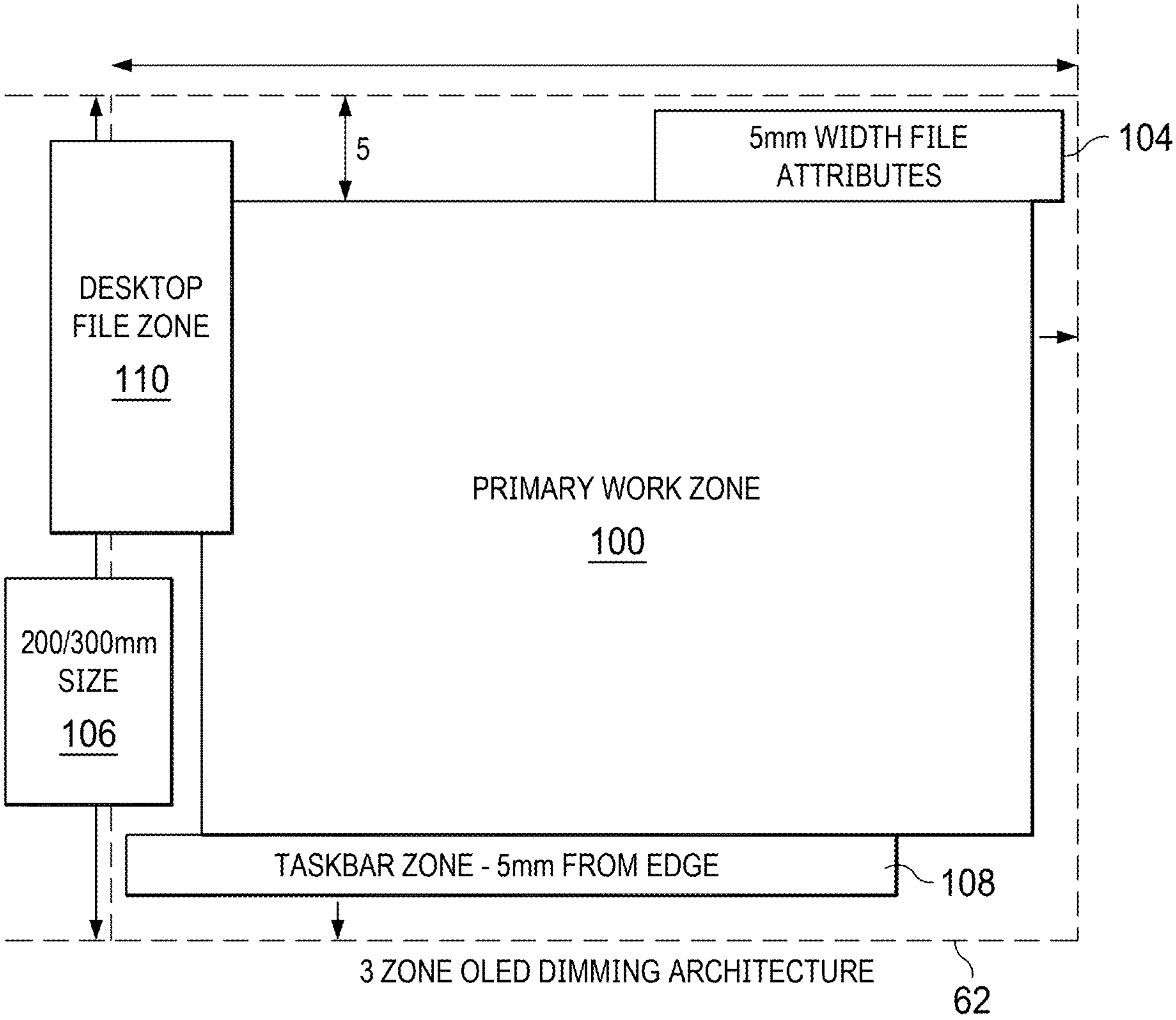
FIG. 5 depicts an example of a display having plural visual image presentation areas that adjust visual image presentation based on end user distance to the display.

Referring now to FIG. 5, an example depicts a display having plural visual image presentation areas that adjust visual image presentation based on end user distance to the display. In the example embodiment, a display film OLED pixel array 62 has three segmented visual zones. A primary work zone 100 is centrally located to present visual images of primary interest to the end user, such as an office document or video. A desktop file zone 110 is located at the side periphery of the display film, such as to present visual images in 200/300 mm size 106 and having a 5 mm width file attribute 104. A taskbar zone 108 presents visual images at a bottom edge of the display film pixel array, such as 5 mm from the edge. In the example embodiment, the display presentation characteristics of visual images presented that the display film is adjusted based upon the operational mode of the display film, the content presented, the location of the content, an end user gaze and a distance of an end user from the display. The display characteristics include brightness, color temperature, sharpness and other factors that have an impact on OLED material degradation. By adjusting the display characteristics based upon visual image zone, the OLED material degradation is managed to reduce image stickiness and improve OLED material useful life.

As an example, the display presents visual images in a generic operating mode when an end user is not present or not engaged with presented content. The generic operating mode has a decreased scan rate, such as 60 HZ versus a maximum scan rate of 120 HZ, a lower brightness, a reduced color temperature and a reduced sharpness. If an end user selects an extended warranty period, the display may remain in the generic operating mode as needed based on end user viewing time to match OLED material degradation to the warranty requirements. For instance, when an end user has an extended warranty but only views the display for less than five hours then some performance operational mode presentation may be included in the fuzzy state as described above. When an end user selects a shorter warranty period and associated performance operational mode presentation, the display may employ a fuzzy state that selectively adapts presentation at the display between generic and performance presentation based on the end user distance and other factors. For instance, in primary work zone 100 a performance operational mode is employed for some content while a generic presentation is employed in desktop file zone 110 and taskbar zone 108. The high performance mode offers greater brightness, color, contrast and sharpness where an end user is focused while the generic performance mode reduces image sticking and OLED material degradation in areas of less interest to the end user, such as by avoiding sharp image edges that burn in when bright colorful and sharp visual images are presented with a high contrast. In one example embodiment, the amount of adjustment for presentation of visual images in the desktop and toolbar zones is increased and decreased based upon a distance of an end user to the display as described in greater detail below.

Figure 6:
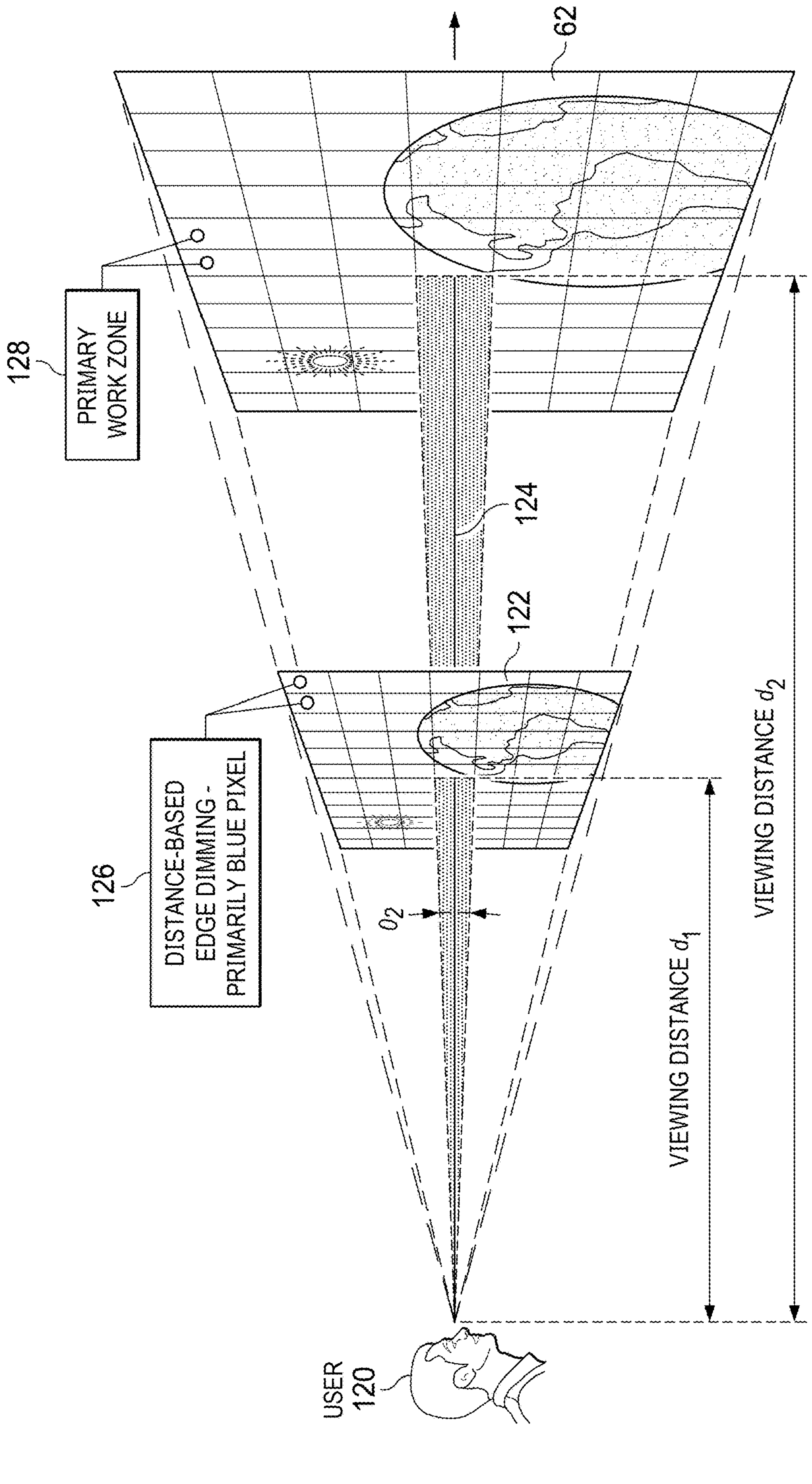
FIG. 6 depicts an example of adjustment of visual image presentation based upon an end user distance to the display.

Referring now to FIG. 6, an example depicts adjustment of visual image presentation based upon an end user distance to the display. In the example embodiment, an end user 120 is depicted having the display OLED pixel array 62 at a first distance d1 and a second greater distance d2. When the distance is greater, an edge zone is more readily viewable to end user 120 than when the distance is less, as shown by the angle 124 associated with a smaller display area 122 at the shorter distance than at the greater distance. At the shorter distance d1, an edge zone has distance based dimming 126 primarily with the blue OLED material that degrades more quickly. At the greater distance d2, an edge zone has primary work zone 128 presentation with full brightness to present the visual images. End user 120 has a better view of the full screen area at the greater distance so that the viewing experience is enhanced with a performance mode presentation while at the shorter distance the end user's experience is not significantly impaired by dimming the visual images at the edges where the end user's focus is reduced. In one example embodiment, the adjustments in brightness and other display characteristics are managed with a gradient based upon a distance to the end user's focused viewing area, such as by gradually decreasing brightness as distance increases from a central part of the work zone. In another example embodiment, gaze tracking of the end user eye is used to adjust the display presentation characteristics.

Figure 7:
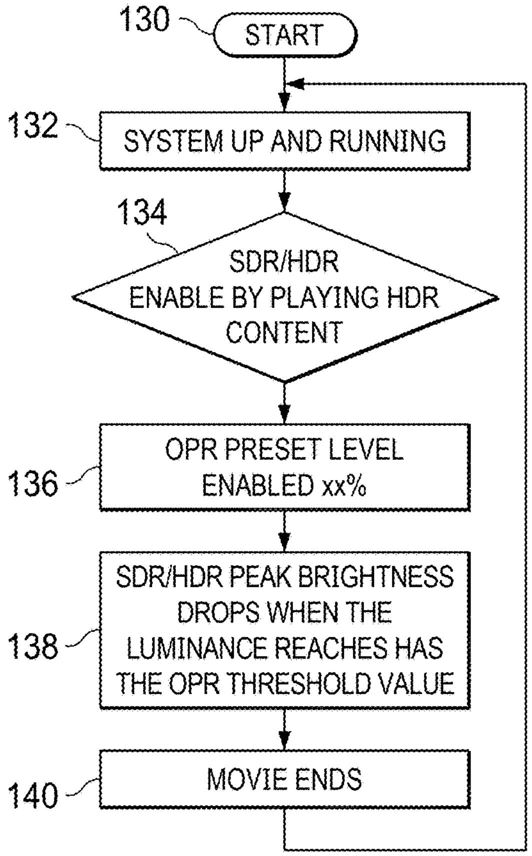
FIG. 7 depicts a flow diagram of an example of display presentation characteristic adjustments based upon a type of visual image presented in a display area.

Referring now to FIG. 7, a flow diagram depicts an example of display presentation characteristic adjustments based upon a type of visual image presented in a display area. In the example embodiment, an on-pixel ratio (OPR) is used for presentation of visual images that reduces display film power consumption and OLED degradation by dynamically adjusting a ratio of active to inactive pixels. When visual images are presented outside of a work zone or within a work zone but having a less dynamic image, such as an office application, the ratio of active pixels is decreased so that power consumption and OLED material degradation are reduced without compromising the end user viewing experience. In the example embodiment, OPR implementation at a display viewing area is adjusted when a video is presented with a high dynamic range (HDR) or standard dynamic range (SDR) mode. When a high performance operational mode is available, such as due to the end user's usage pattern versus warranty life selection, movies are presented with color having HDR or SDR, which can result in power/current use that exceeds an OPR limit. The display film timing controller monitors current draw within the movie presentation and limits current by reducing luminance per a preset value when current limits are exceeded. The limit is enforced to reduce power consumption and extend OLED material consistent with desired warranty coverage.

Figure 8:
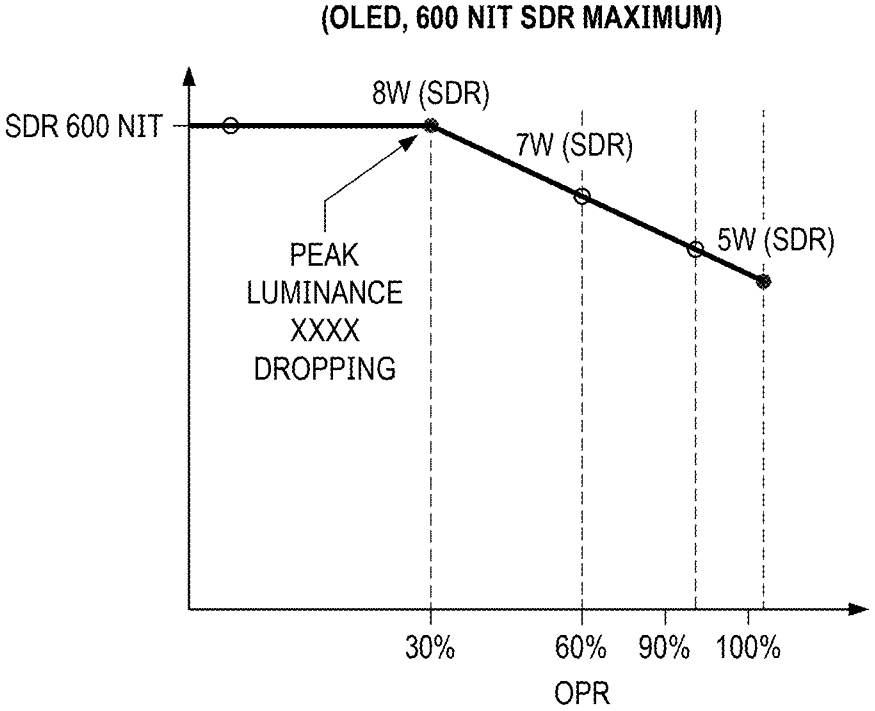
FIG. 8 depicts an example graph of a 30% OPR preset value in which the timing controller reduces SDR peak brightness of 600 nits for a movie scene once the 30% OPR threshold is reached.

The process starts at step 130 and at step 132 the system operates with visual information presented at the display, such as in windows having different application content. At step 134 a determination is made of whether and SDR or HDR content is initiated, such as by playing a movie having SDR or HDR visual images. When the content includes HDR or SDR content, the method continues to step 136 to enable a preset level for OPR at a given percent. The table depicts OPR preset values as a percentage for SDR and HDR presentation of visual images with the associated luminance and total maximum power for the different OPR present values. At step 138 the SDR/HDR peak brightness drops when the luminance reaches the OPR threshold value as defined by the table. Management of peak luminance and associated power draw continues until step 140 when the movie content completes. FIG. 8 depicts an example graph of a 30% OPR preset value in which the timing controller reduces SDR peak brightness of 600 nits for a movie scene once the 30% OPR threshold is reached.

Figure 9:
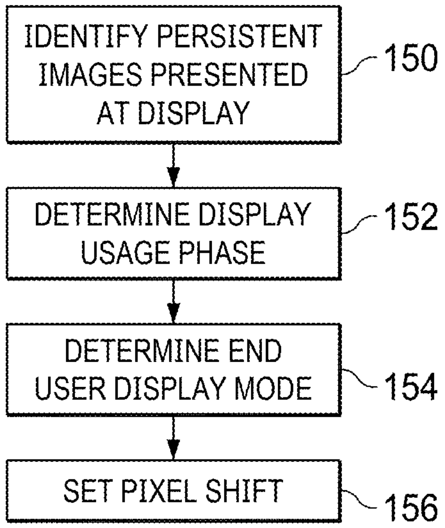
FIG. 9 depicts a flow diagram of a process for managing OLED material degradation to reduce image stickiness.

Referring now to FIG. 9, a flow diagram depicts a process for managing OLED material degradation to reduce image stickiness. The process starts at step 150 with identification of persistent images presented at a display. A persistent image may be defined in a variety of ways to include an operating system icon, other types of icons, windows of defined boundaries or any boundaried visual image that can create image stickiness or burn in when presented at one location for an extended time period. For instance, a window that defines a boundary for a movie might have a stickiness at the boundary even though the movie within the window changes content with video images. When a boundaried visual image is detected by persistent presentation at the display the process continues to step 152 to determined the display phase usage. As is described above a first phase involves presentation of visual images up to a brightness limitation and a second phase involves reduction of overall brightness by OLED material degradation to less than the brightness limitation. In alternative embodiments, other standards for the phases may be used. At step 154 a determination is made of the end user display mode, such as generic or performance operational mode. The phase and display mode are then applied at step 156 to set a pixel shift that limits the impact of the persistent image presentation adjusted for the display environment. The pixel shift increments movement of the boundaried visual image in a minimal manner so that the movements are not apparent to the end user. For example, the movements may shift the boundary left/right and/or up/down pixel-by-pixel at a set rate for a defined number of pixels with the shifting occurring at a defined rate. Other shift patterns might include increasing and decreasing the size of the visual image in increments or rotating the visual image in increments.

Figure 10:
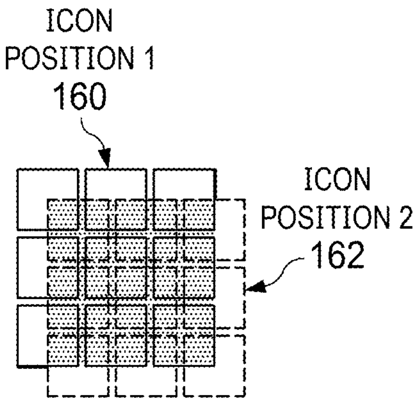
FIG. 10 depicts an example of pixel shift with the display in a first phase of operation, such as in the first 2000 hours of operation.
Figure 10:
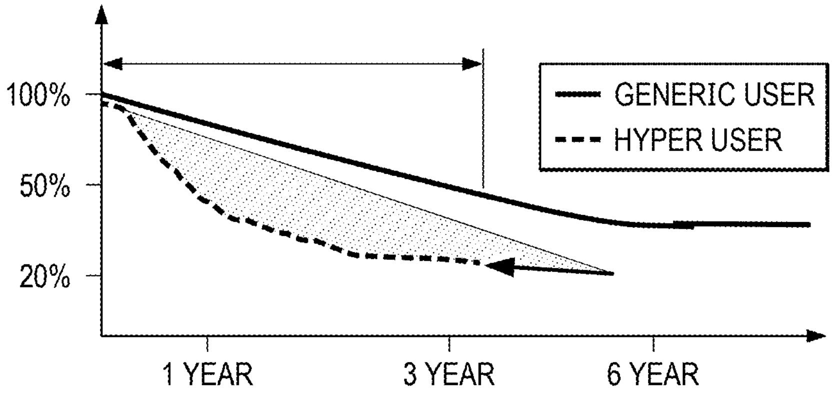

Referring now to FIG. 10, an example of pixel shift is depicted with the display in a first phase of operation, such as in the first 2000 hours of operation. In the example embodiment, the icon first position 160 and icon second position 162 are shifted sideways and vertically relative to each other so that the border of the icon is misaligned between the first and second positions. The shift in position is tracked in the timing controller with the amount of shift based upon the utility associated with the icon, the brightness of each icon type, the time for which the icon is presented and the distance of the shift defined as a percentage of the pixel size for a generic user mode. The amount of shift and the time between shifts are managed to minimize any notice taken by an end user and to have enough shift distance that the boundary along the icon image blends with the surrounding display presentation rather than burning into a sticky position. When a tandem OLED is used, icon position is shifted top and bottom and also sideways. The example table indicates shifting for an example embodiment with a generic user. In the event of a high performance or hyper user, the more rapid degradation of OLED material is tracked and the shift is modified to have an increase by a factor of two. The shift is centralized about a home or anchor position for the icon or other persistent image boundary. The amount of shift can vary based upon the contrast and sharpness at the boundary so that an adequate boundary blending with the area outside of the boundary is achieved.

Figure 11:
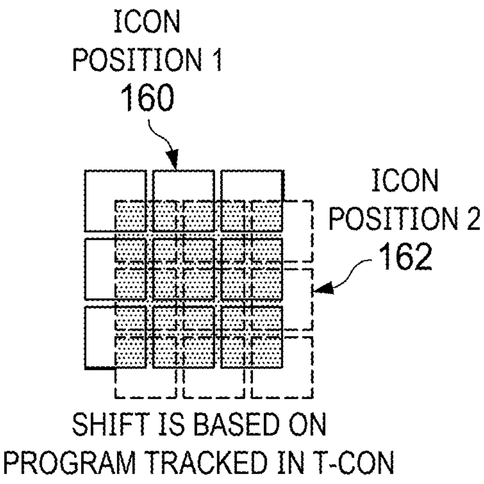
FIG. 11 depicts an example of pixel shift with the display in a second phase of operation, such as at 6000 hours of operation.
Figure 11:
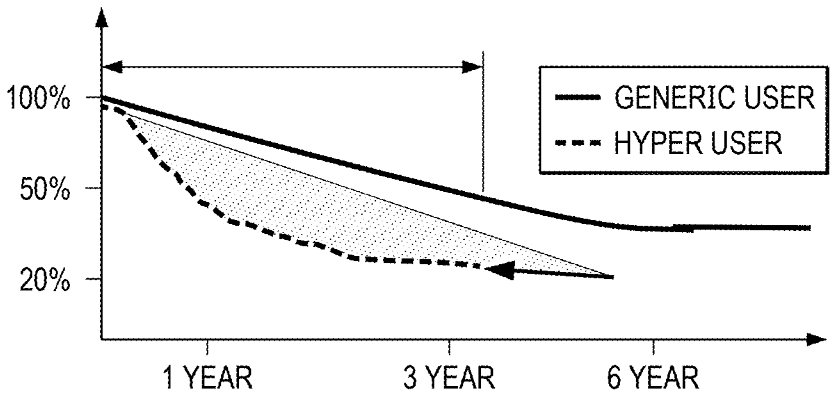

Referring now to FIG. 11, an example of pixel shift is depicted with the display in a second phase of operation, such as at 6000 hours of operation. As with phase 1 shifting, the amount of shifting varies with the utility, brightness, display time and distance for each boundaried visual image relative to an anchor position. In phase 2, blue OLED material degradation tends to be worse so that image sticking may appear more red to improve the visual quality of the screen. The shifting is accompanied by an increase in green pixel power to provide an equivalent offset of blue. The amount of shifting is increased where the display presents visual images in the performance mode as compared to the generic mode.

Figure 12:
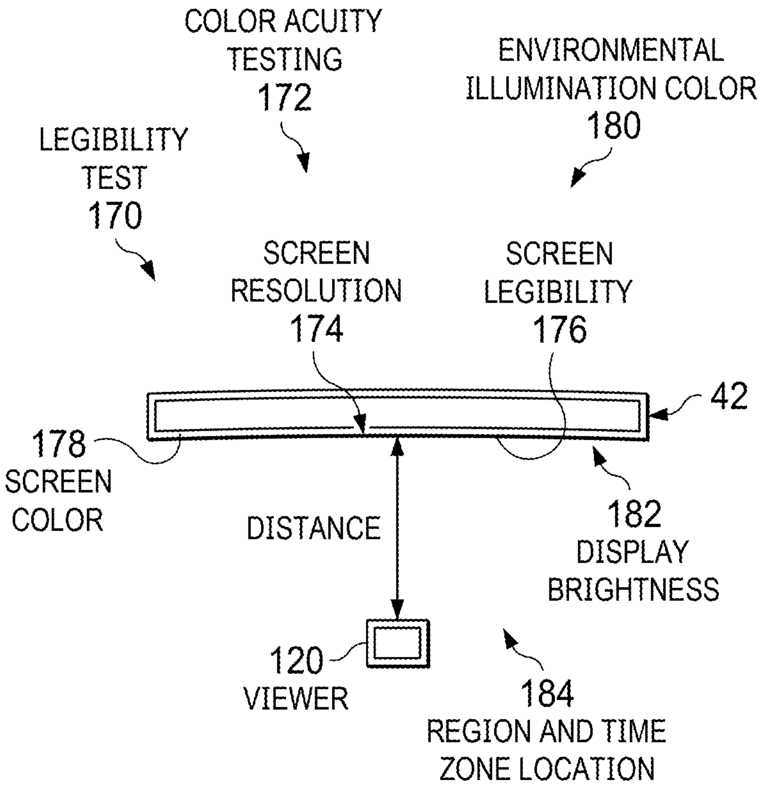
FIG. 12 depicts a block diagram of an example embodiment of a display film having presentation of visual images adapted to achieving display characteristics that improve end user viewing comfort and productivity.

Referring now to FIG. 12, a block diagram depicts an example embodiment of a display film 42 having presentation of visual images adapted to achieving display characteristics that improve end user viewing comfort and productivity. Although the example embodiment works with a display film having OLED material in conjunction with management of OLED material degradation and warranty life, the display characteristic adjustments may also aid in productivity with other types of displays, such as LCDs. In the example embodiment, an end user viewer 120 of display film 42 has the environment monitored for comfort characteristics and the end user comfort level is related to productivity as a function of end user interactions, such as work accomplished in different levels of comfort. Logic to manage the determination of comfort and associated productivity measures is executed on a processing resource, such as with a CPU executing a module of an operating system display driver stored in a solid state drive. The comfort and productivity model may use various logical structures for machine learning and artificial intelligence with an output provided for display characteristics that present visual images from the display film. For instance, supervised learning involves classification and regression to define display characteristics, such as with linear regression, logistic regression, random forest and neural networks. Unsupervised learning involves clustering and association, such as with K-means clustering, principal component analysis, t-distributed stochastic neighbor embedding and association rules. Semi-supervised learning involves classification and clustering, such as uClassify and GATE analysis. Reinforcement learning involves classification and control, such as Q-learning, Monte Carlo tree search, temporal difference, and asynchronous actor-critic agents. In one embodiment, linear regress is used to measure end user comfort and temporal difference is used to measure performance or productivity as a function of time of day and how long displayed visual images are viewed. In alternative embodiments, other types of logic may be employed based upon available resources and the information applied to determine comfort and productivity.

As an initial matter, an end user's viewing acuity is measured to determine individual sensitivity to light an movement at a display visual image. For example, the end user is presented with a variety of moving and still visual images that the end user interacts with to measure the end user viewing acuity and productivity in different viewing conditions. The initialization may include text with object names, such as "Apples are red and bananas are yellow," and objects of different colors, such as images of cars, trees, boats, men, women, and children. The viewer interacts with the text and images in a variety of viewing conditions with the interaction timed for efficiency and measured for accuracy. The conditions are compared with the end user interactions to measure the end user sensitivity to light and other factors, such as different types of color blindness. From these results and the result of operational interactions, a comfort scale is computed and related to the end user productivity, which may be optimal at less than the most comfortable viewing conditions. The data is stored and associated with the end user so that display of visual images is adjusted when the end user signs in to have end user comfort and productivity balanced with OLED material degradation and warranty life. As an example, an end user color blindness allows a different array of colors to present an image perceived by a color blind user in a similar manner while also preserving OLED material life and maintaining a desired amount of illumination associated with a productivity level.

FIG. 12 depicts on example of factors detected and managed to achieve improved productivity with display characteristics that target end user viewing comfort. The inputs include an identification of the end user and retrieval of the personal characteristics from initialization and subsequent tracking. The display film performance characteristics are determined, such as screen dimensions, size, resolution and blue point. In the example embodiment, a legibility test 170 and color acuity test 172 initialize the end user comfort model, and screen resolution 174, screen legibility 176, screen color 178, environmental light conditions 180, and display brightness 182 are monitored during end user interactions. Other productivity factors include the region and time zone 184 and end user distance to the display. Environmental conditions of ambient light brightness and color temperature are measured by an ambient light sensor. End user interactions, such as distance, blinking rates, eye movements, and facial state (nervous versus relaxed), are measured by a camera and/or IR sensor. Other factors may include local weather read through a network interface, circadian cycles, age, gender, ethnicity and color sensitivity may be modeled.

Display characteristics are adjusted to improve productivity based on the modeled end user comfort and end user preferences for personalized viewing of visual images. Some examples of display characteristic adjustments include: adjusting screen legibility with distance; adjusting screen resolution with distance and application used to generate the visual image; adjusting for viewer color sensitivity, such as color blindness; adjusting color with preferences, such as for child videos versus adult movies and other entertainment; adjusting color with ethnicity; adjusting skin tone with ethnicity and gender; adjusting screen brightness and blue point with environmental illumination; adjusting screen brightness and blue point with local time and circadian cycle; and adjusting screen refresh rate and/or brightness with viewer stress status as indicated by eye blinking, eye movement and facial expressions. At initiation of end user monitoring for optimized display characteristics, an initial default input is determined with a camera view of the end user that reduces eye strain, such as is indicated by blinking rate, reduces viewer stress, such as is indicated by blink rate and eye movement, and view distance where display brightness is defined to adjust by a quadratic equation that distance (d) minus productivity (P) equals $a6+b6*d+c6d^2$. From this initial default learning, optimized settings for comfort (Ci) and productivity (Pi) are provided as a function of time and display characteristics $U)(t)=(W1*^{P}i(t)-W2*^{C}i(t-1))$.

Machine learning adapts display characteristics to optimize productivity where comfort is proportional to productivity. Productivity is measured by the speed and accuracy of doing tasks. The display characteristics managed to adjust comfort and thereby productivity are, in order of importance: brightness, screen glare, sharpness, color vibrance, and image stability. Each display characteristic is modeled by a quadratic equation of the form for the initial setting. Display brightness uses a quadratic equation because a display brightness too high or low is difficult to see. Glare is modeled from ambient conditions and display brightness with a quadratic equation that adapts glare reductions at low levels of zero to four percent. Sharpness is defined by display line spread with a quadratic equation because too low of a value, such as 0.25 pixels, makes edges and text jagged and too high, such as 1.5 pixels, makes edges and text blurry. Color vibrance is defined as IPT colorfulness since color has a nonlinear improvement. Image stability is defined by frame rate since the frame rate as a nonlinear improvement. In various embodiments, the model for display characteristics may vary and use different parameters.

Figure 13:
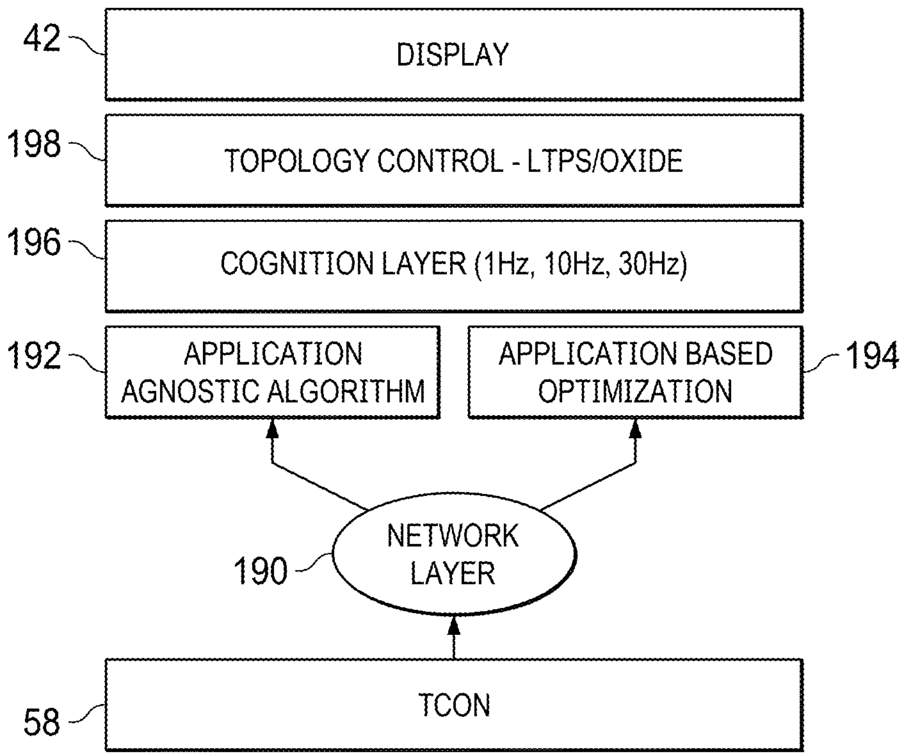
FIG. 13 depicts a block diagram of an example of logical elements that cooperate to adjust display characteristic to enhance end user productivity with monitoring of end user comfort.

Referring not to FIG. 13, a block diagram depicts an example of logical elements that cooperate to adjust display characteristic to enhance end user productivity with monitoring of end user comfort. In the example embodiment, an artificial intelligence power control is applied to the display characteristics with dynamic asymptotic frequency modulation with random software walk. In the example embodiment, a timing controller 58 generates a scan of pixel values for presentation at a display film 42 managed by topology control of a low-temperature polycrystalline silicon 198. A cognition layer 196 operates at 1, 10 or 30 Hz to detect display presentation characteristics. The display characteristics are modified by an application agnostic algorithm 192 or an application based optimization 194 to adapt presentation of visual images. A network layer 190 enables communication of information between the algorithms, sensors and timing controller so that logic may be employed to adapt the display characteristics as different conditions are recognized. In various embodiments, various hardware, software and firmware components cooperate to provide effective management of display characteristics.

Figure 14:
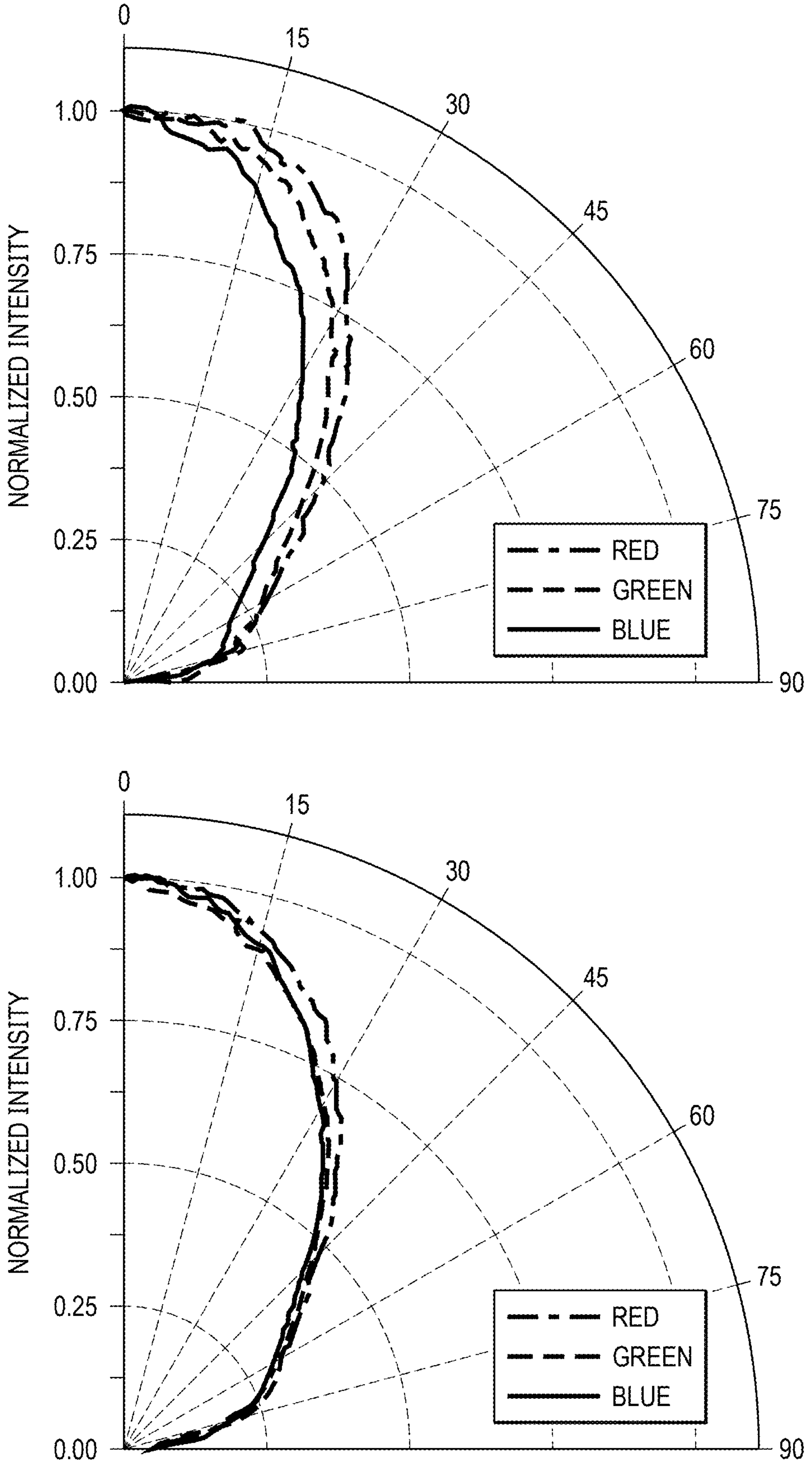
FIG. 14 depicts example graphs of viewing angles and normalized display intensity to improve end user productivity.

Referring now to FIG. 14, example graphs depict viewing angles and normalized display intensity to improve end user productivity. The application layer topology and context control adjust the display characteristics for red, green and blue pixels based on end user characteristics, environment and display characteristics. For example, screen resolution is adjusted with distance between the end user and display to provide edge power calibration. Viewer color capability is adjusted for color sensitivity, such as color blindness. Color is modified by user preferences, such as based on video type, office application type, or other application specific settings. The OLED material degradation is managed in a manner that combines image quality, end user capabilities and application settings. For instance, increased illumination in the red spectrum can increase illumination for a red color blind individual, thereby reducing degradation of blue OLED material.

Although the present invention has been described in detail, it should be understood that various changes, substitutions and alterations can be made hereto without departing from the spirit and scope of the invention as defined by the appended claims.

What is claimed is:

1. An information handling system comprising:

a housing;

a processor disposed in the housing and operable to execute instructions that process information;

a memory disposed in the housing and interfaced with the processor, the memory operable to store the instructions and information;

a display interfaced with the processor and operable to present the information as visual images by generating illumination with plural pixels, each of the plural pixels having organic light emitting diode (OLED) material;

a non-transitory memory interfaced with the processor and operable to store the instructions and information when power is off; and instructions stored in the non-transitory memory that when executed cause:

collection of OLED material usage information;

identification of one or more boundary visual images presented at the display with a predetermined persistence;

shifting of the one or more boundary visual images to plural positions at the display based upon the usage information;

detect a brightness associated with each of a plural of the one or more boundary visual images; and apply a different pattern of shift to each of the plural of the one or more boundary visual images based upon the brightness.

2. The information handling system of claim 1, wherein the instructions further selectively:

present visual images with a generic mode having a first OLED material degradation;

present visual images with a performance mode having a second OLED material degradation; and shift the one or more boundary visual images to the plural positions with a first pattern in the generic mode and a second pattern in the performance mode.

3. The information handling system of claim 1, wherein the instructions further:

apply a first pattern of pixel shift when the OLED material has less than a predetermined degradation; and apply a second pattern of pixel shift when the OLED material has greater than the predetermined degradation.

4. The information handling system of claim 1, wherein shifting comprises incremental vertical and horizontal shifts of the boundary visual image position at predetermined time intervals.

5. The information handling system of claim 1, wherein the shifting comprises incremental increases and decreases of the area of the one or more boundary visual images.

6. The information handling system of claim 1, wherein the instructions further:

assign at least a portion of the visual images presented at the display as in a primary work zone; and only shift the one or more boundary visual images located outside of the primary work zone.

7. The information handling system of claim 1, wherein the instructions further:

detect a distance to an end user from the display; and adjust the pattern of shifting the one or more boundary visual images based upon the distance.

8. The information handling system of claim 7, wherein the shifting comprises incremental rotation of the orientation of the one or more boundary visual images.

9. A method for presenting visual images by an information handling system display having plural pixels of organic light emitting diode (OLED) material, the method comprising:

collecting OLED material usage information;

identifying one or more boundary visual images presented at the display with a predetermined persistence;

detecting a brightness associated with each of a plural of the one or more boundary visual images;

shifting the one or more boundary visual images to plural positions at the display based upon the usage information; and applying a different pattern of shift to each of the plural of the one or more boundary visual images based upon the brightness.

10. The method of claim 9, further comprising:

shifting with a first movement by incremental horizontal movement of the boundary visual images relative to an anchor position; and shifting with a second movement by incremental vertical movement of the boundary visual images relative to the anchor position.

11. The method of claim 10, further comprising:

presenting visual images with a generic mode having a first OLED material degradation;

presenting visual images with a performance mode having a second OLED material degradation; and shifting the one or more boundary visual images to the plural positions with a first pattern in the generic mode and a second pattern in the performance mode.

12. The method of claim 10, further comprising:

detecting a distance between an end user viewing the display and the display; and adjusting a pattern of the shifting based upon the distance.

13. The method of claim 10, wherein the boundary visual images comprise operating system icons.

14. The method of claim 10, wherein the boundary visual images comprise a window having a movie playing within a perimeter.

15. The method of claim 10, wherein the boundary visual images comprise a window having a word processing document within a perimeter.

16. A display comprising:

a display film having plural pixels of organic light emitting diode (OLED) material;

a processing resource operable to execute instructions that process information; and a non-transitory memory storing instructions that when executed on the processing resource cause:

collection of OLED material usage information;

identification of one or more boundary visual images presented at the display with a predetermined persistence;

shifting of the one or more boundary visual images to plural positions at the display based upon the usage information;

detect a brightness associated with each of a plural of the one or more boundary visual images; and apply a different pattern of shift to each of the plural of the one or more boundary visual images based upon the brightness.

17. The display of claim 16, wherein the instructions further:

shift with a first movement by incremental horizontal movement of the boundary visual images relative to an anchor position; and shift with a second movement by incremental vertical movement of the boundary visual images relative to the anchor position.

18. The display of claim 17, wherein the instructions further:

detect a distance between an end user viewing the display and the display; and adjusting a pattern of the shifting based upon the distance.

19. The display of claim 16, wherein the instructions further shift by increasing and decreasing a perimeter of the boundary visual images.

* * * * *